United States Patent
Wilkinson et al.

(10) Patent No.: US 12,193,413 B2
(45) Date of Patent: Jan. 14, 2025

(54) ELECTRONIC ANIMAL TAG READER

(71) Applicant: ALLFLEX AUSTRALIA PTY LTD, Queensland (AU)

(72) Inventors: Benjamin Thomas John Wilkinson, Queensland (AU); Aaron John Woodland, Queensland (AU); Brian Antony Clayton, Queensland (AU)

(73) Assignee: ALLFLEX AUSTRALIA PTY LTD, Queensland (AU)

( * ) Notice: Subject to any disclaimer, the term of this patent is extended or adjusted under 35 U.S.C. 154(b) by 412 days.

(21) Appl. No.: 17/429,594

(22) PCT Filed: Feb. 8, 2019

(86) PCT No.: PCT/AU2019/050092
§ 371 (c)(1),
(2) Date: Aug. 9, 2021

(87) PCT Pub. No.: WO2020/160587
PCT Pub. Date: Aug. 13, 2020

(65) Prior Publication Data
US 2022/0132808 A1    May 5, 2022

(51) Int. Cl.
*A01K 29/00* (2006.01)
*A01K 1/00* (2006.01)
(Continued)

(52) U.S. Cl.
CPC .......... *A01K 29/005* (2013.01); *A01K 1/0023* (2013.01); *A01K 1/0613* (2013.01);
(Continued)

(58) Field of Classification Search
None
See application file for complete search history.

(56) References Cited

U.S. PATENT DOCUMENTS

| 85,575 A | 1/1869 | Drake |
|---|---|---|
| 377,588 A | 2/1888 | Walsh, Jr. |

(Continued)

FOREIGN PATENT DOCUMENTS

| AU | 199534570 | 10/1994 |
|---|---|---|
| AU | 2003239832 | 5/2002 |

(Continued)

OTHER PUBLICATIONS

Extended European Search Report for Europe Patent Application No. 19914242.3, dated Sep. 8, 2022, 8 pages.
(Continued)

*Primary Examiner* — John F Mortell
(74) *Attorney, Agent, or Firm* — Keith O'Doherty; Jenny Cromsigt

(57) ABSTRACT

A reader comprising: a panel; two antennae each associated with a respective race to transmit and/or receive information to/from an electronic animal tag in that respective race; and an electromagnetic shield to impede an antenna from transmitting and/or receiving information to/from an electronic animal tag not located in the respective race of that antenna; a system for reading electronic animal tags comprising: a plurality of readers each located at or near a wall of a respective plurality of races, wherein each reader is at least partially shielded by an electromagnetic shield; each reader being longitudinally offset with respect to at least one other reader in the plurality of readers; and methods of constructing and using a reader.

13 Claims, 6 Drawing Sheets

(51) Int. Cl.
*A01K 1/06* (2006.01)
*A01K 11/00* (2006.01)
*G06K 7/10* (2006.01)

(52) U.S. Cl.
CPC ........ *A01K 11/006* (2013.01); *G06K 7/10079* (2013.01); *G06K 7/10425* (2013.01)

(56) References Cited

U.S. PATENT DOCUMENTS

| | | |
|---|---|---|
| 584,121 A | 6/1897 | Sanders |
| 818,783 A | 4/1906 | Philippi |
| 823,079 A | 6/1906 | Rais |
| 1,016,752 A | 2/1912 | Leith |
| 1,188,510 A | 6/1916 | Timson |
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ketchum |
| 2,420,020 A | 5/1947 | Snell |
| 2,553,400 A | 5/1951 | Blair |
| 2,570,048 A | 10/1951 | Cooke et al. |
| 3,091,770 A | 6/1963 | McMurray et al. |
| 3,261,243 A | 7/1966 | Ellison |
| 3,596,541 A | 8/1971 | Bieganski |
| 3,812,859 A | 5/1974 | Murphy et al. |
| 3,884,100 A | 5/1975 | Fideldy |
| 3,981,209 A | 9/1976 | Caroff |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,666,436 A | 5/1987 | McDonald et al. |
| 4,672,966 A | 6/1987 | Haas, Jr. |
| 4,696,119 A | 9/1987 | Howe et al. |
| 4,716,899 A | 1/1988 | Huenefeld et al. |
| 4,819,639 A | 4/1989 | Gardner |
| 4,821,683 A | 4/1989 | Veldman |
| 4,878,302 A | 11/1989 | Jowsey |
| 4,943,294 A | 7/1990 | Knapp |
| 5,022,253 A | 6/1991 | Parlatore |
| 5,056,385 A | 10/1991 | Petersen |
| 5,141,514 A | 8/1992 | van Amelsfort |
| 5,154,721 A | 10/1992 | Perez |
| 5,267,464 A | 12/1993 | Cleland |
| 5,509,291 A | 4/1996 | Nilsson et al. |
| 5,651,791 A | 7/1997 | Zavlodaver et al. |
| 5,778,820 A | 7/1998 | van der Lely et al. |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Guichon et al. |
| 6,659,039 B1 | 12/2003 | Larsen |
| 6,772,556 B1 | 8/2004 | Liu |
| 6,868,804 B1 | 3/2005 | Huisma et al. |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| 7,705,736 B1 | 4/2010 | Kedziora |
| 7,772,979 B2 | 8/2010 | Nehls |
| 7,843,350 B2 | 11/2010 | Geissler et al. |
| 7,937,861 B1 | 5/2011 | Zacher |
| 8,005,624 B1 | 8/2011 | Starr |
| 8,266,990 B1 | 9/2012 | Janson |
| 8,305,220 B2 | 11/2012 | Gibson |
| 8,478,389 B1 | 7/2013 | Brockway et al. |
| 8,622,929 B2 | 1/2014 | Wilson et al. |
| 8,763,557 B2 | 7/2014 | Lipscomb et al. |
| 8,955,462 B1 | 2/2015 | Golden et al. |
| 8,979,757 B2 | 3/2015 | Mottram et al. |
| 9,215,862 B2 | 12/2015 | Bladen et al. |
| 9,392,767 B2 | 7/2016 | Talt et al. |
| 9,392,946 B1 | 7/2016 | Sarantos et al. |
| 9,449,487 B1 | 9/2016 | Spitalny |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,760,826 B1 * | 9/2017 | Stine .................. G06K 7/10079 |
| 9,848,577 B1 | 12/2017 | Brandao et al. |
| 9,861,080 B1 | 1/2018 | Hathway et al. |
| 10,004,204 B2 | 6/2018 | Hayes et al. |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen et al. |
| 10,231,442 B1 | 3/2019 | Chang et al. |
| 10,242,547 B1 | 3/2019 | Struhsaker et al. |
| 10,264,762 B1 | 4/2019 | Lamb |
| 10,352,759 B1 | 7/2019 | Jensen |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,756 B1 | 4/2020 | Kuper et al. |
| 10,638,726 B1 | 5/2020 | Makarychev et al. |
| 10,691,674 B2 | 6/2020 | Leong et al. |
| 2001/0027751 A1 | 10/2001 | van den Berg |
| 2002/0010390 A1 | 1/2002 | Guice et al. |
| 2002/0021219 A1 | 2/2002 | Edwards |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape et al. |
| 2003/0004652 A1 | 1/2003 | Brunner et al. |
| 2003/0023517 A1 | 1/2003 | Marsh et al. |
| 2003/0028327 A1 | 2/2003 | Brunner et al. |
| 2003/0062001 A1 | 4/2003 | Hakan |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2005/0006153 A1 * | 1/2005 | Baarsch ................. G01G 17/08 177/25.13 |
| 2005/0010333 A1 | 1/2005 | Lorton et al. |
| 2005/0026181 A1 | 2/2005 | Davis et al. |
| 2005/0097997 A1 | 5/2005 | Hile |

(56) References Cited

U.S. PATENT DOCUMENTS

| | | |
|---|---|---|
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0250253 A1 | 11/2006 | Liu |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | DeLonzor et al. |
| 2007/0027375 A1 | 2/2007 | Melker et al. |
| 2007/0027377 A1 | 2/2007 | DeLonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | LeBoeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009388 A1 | 1/2009 | Wangrud |
| 2009/0015381 A1 | 1/2009 | Mochida et al. |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0113902 A1 | 5/2010 | Hete et al. |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0201494 A1 | 8/2010 | Ryou et al. |
| 2010/0217102 A1 | 8/2010 | LeBoeuf et al. |
| 2010/0250198 A1 | 9/2010 | Lorton et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Maltz et al. |
| 2011/0018717 A1 | 1/2011 | Takahashi et al. |
| 2011/0041367 A1 | 2/2011 | Bladen et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0163903 A1 | 7/2011 | Bernhardt |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0325153 A1 | 12/2012 | Mostert |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |
| 2013/0113622 A1 | 5/2013 | Pratt et al. |
| 2013/0119142 A1 | 5/2013 | McCoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0282295 A1 | 10/2013 | White et al. |
| 2013/0285815 A1 | 10/2013 | Jones, II |
| 2014/0027511 A1 | 1/2014 | Plocher et al. |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |

(56) References Cited

U.S. PATENT DOCUMENTS

| | | |
|---|---|---|
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | McLaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0109130 A1 | 4/2015 | Rajkondawar et al. |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | John |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | Leboeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0049074 A1* | 2/2017 | Wilkinson ............ A01K 1/0017 |
| 2017/0067770 A1 | 3/2017 | Sun |
| 2017/0079247 A1 | 3/2017 | Womble et al. |
| 2017/0280675 A1 | 3/2017 | MacNeil et al. |
| 2017/0095206 A1 | 4/2017 | Leib et al. |
| 2017/0156288 A1 | 6/2017 | Singh |
| 2017/0164905 A1 | 6/2017 | Gumiero |
| 2017/0193208 A1 | 7/2017 | Ashley et al. |
| 2017/0193255 A1 | 7/2017 | Shoarinejad |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0027772 A1 | 2/2018 | Gordon et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0113498 A1 | 4/2018 | Cronin et al. |
| 2018/0131074 A1* | 5/2018 | Wilkinson ............ A01K 1/0613 |
| 2018/0132455 A1 | 5/2018 | Pradeep et al. |
| 2018/0146645 A1 | 5/2018 | Arbel |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |
| 2019/0159428 A1 | 5/2019 | Bolen |
| 2019/0166802 A1 | 6/2019 | Seltzer et al. |
| 2019/0180587 A1* | 6/2019 | Bergman ............... G06F 3/147 |
| 2019/0183091 A1 | 6/2019 | Betts-LaCroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2019/0387711 A1 | 12/2019 | Flennert et al. |
| 2020/0015740 A1 | 1/2020 | Alnofeli et al. |
| 2020/0037886 A1 | 2/2020 | Greer et al. |
| 2020/0045932 A1* | 2/2020 | Knight ................. G01S 13/878 |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178504 A1 | 6/2020 | Moss et al. |
| 2020/0178505 A1 | 6/2020 | Womble et al. |
| 2020/0178800 A1 | 6/2020 | Geissler et al. |
| 2020/0205381 A1 | 7/2020 | Wernimont et al. |

(56) References Cited

U.S. PATENT DOCUMENTS

| | | | |
|---|---|---|---|
| 2020/0229391 | A1 | 7/2020 | De Groot |
| 2020/0229707 | A1 | 7/2020 | Donnelly |
| 2020/0242551 | A1 | 7/2020 | Lau et al. |
| 2020/0281151 | A1 | 9/2020 | Schmidt |
| 2022/0020051 | A1 | 1/2022 | Aruga et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 10/1988 |
| BR | 112012018909 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 105701430 A | 6/2016 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 202013011075 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| EP | 4001951 A1 | 5/2022 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |

(56) References Cited

FOREIGN PATENT DOCUMENTS

| | | |
|---|---|---|
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2468587 | 9/2010 |
| GB | 2468587 A | 9/2010 |
| GB | 2469326 | 10/2010 |
| GB | 2554636 | 9/2016 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 101747418 | 1/2011 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | WO 96/01459 | 1/1996 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000005675 A1 | 2/2000 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005034617 A1 | 4/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 20060036567 A1 | 4/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 200801803 A2 | 2/2008 |
| WO | 2008033042 | 3/2008 |
| WO | 2008041839 A1 | 4/2008 |
| WO | 2008052298 | 5/2008 |
| WO | 2008075974 | 6/2008 |
| WO | 2008108667 A1 | 9/2008 |
| WO | WO 2008/108667 | 9/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014082045 A1 | 5/2014 |
| WO | WO 2014/082045 | 5/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |

(56) References Cited

FOREIGN PATENT DOCUMENTS

| | | |
|---|---|---|
| WO | 2016108187 | 7/2016 |
| WO | 2016166748 | 10/2016 |
| WO | 2016176728 A1 | 11/2016 |
| WO | WO 2016/176728 | 11/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019046216 | 3/2019 |
| WO | 2019048521 A1 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019226100 A1 | 11/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

International Search Report and Written Opinion for International (PCT) Patent Application No. PCT/AU2019/050092, dated Apr. 16, 2019, 7 pages.
International Preliminary Report on Patentability for International (PCT) Patent Application No. PCT/AU2019/050092, dated May 27, 2021, 74 pages.
Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, The Journal of Dairy Research; Cambridge vol. 84, Iss. 2, (May 2017): 132-138.
Clark, C., Lyons, N., Millapan, L., Talukder, S., Cronin, G., Kerrisk, K., Garcia, S. (2015), Rumination and activity levels as predictors of calving for dairy cows, Animal, 9(4), 691-695.
K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.
L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.
S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.
N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.
The role of sensors, big data and machine learning in modern animal farming; Suresh Neethirajan; Received in revised form Jun. 30, 2020; Accepted Jul. 3, 2020 Sensing and Bio-Sensing Research 29 (2020) 100367 2214-1804/ © 2020 The Author. Published by Elsevier B.V.
A Review on Determination of Computer Aid Diagnosis and/or Risk Factors Using Data Mining Methods in Veterinary Field Pinar Cihan, Erhan Gökçe, Oya Kalipsiz; Tekirdağ Namik Kemal University, Çorlu Faculty of Engineering, Department of Computer Engineering, Tekirdağ, Turkey. 2019.
Animal Science. Big Data Analytics and Precision Animal Agriculture Symposium: Data to decisions B. J. White, D E. Amrine, and R. L Larson Beef Cattle Institute, Kansas State University, Manhattan, KS; © The Author(s) 2018. Published by Oxford University Press on behalf of American Society of Animal Science.
Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.
Drying Up Cows and the Effect of Different Methods Upon Milk Production; Ralph Wayne, C. H. Eckles, and W. E. Peterson; Division of Dairy Husbandry, University of Minnesota, St. Paul; Research-Articlelvol. 16, Issue 1, p. 69-78, Jan. 1, 1933.
Eagan, B. H., B. Eagan, and A. Protopopova. "Behaviour Real-Time spatial tracking identification (BeRSTID) used for cat behaviour monitoring in an animal shelter." Scientific reports 12.1 (2022): 17585.
Garrido-Jurado, Sergio, et al. "Automatic generation and detection of highly reliable fiducial markers under occlusion." Pattern Recognition 47.6 (2014): 2280-2292.
Steve Nadis. "Invisible machine-readable labels that identify and track objects". Retrieved online on Sep. 3, 2023. URL: https://www.wevolver.com/article/invisible-machine-readable-labelsthat-identify-and-track-objects.
Prandini et al., Comparison of infectious bursa! disease live vaccines and a HVT-IBD vector vaccine and their effects on the immune system of commercial layer pullets. Avian Pathology. Mar. 17, 2016, vol. 45, pp. 114-125; abstract; p. 117, col. 1, para 2; p. 117, col. 2, para 1; p. 117, col. 2, para 2; p. 118, col. 1, para 2; p. 123, col. 1, para 1; p. 123, col. 1, para 2; p. 123, col. 2, para 3; Table 1.
Muniz et al., Molecular epidemiologic survey of infectious bursa! disease viruses in broiler farms raised under different vaccination programs. Journal of Applied Poultry Research. 2018, vol. 27, pp. 253-261; abstract.

\* cited by examiner

ELECTRONIC ANIMAL TAG READER

CROSS REFERENCE TO RELATED APPLICATIONS

This application is a national stage application under 35 U.S.C. 371 and claims the benefit of PCT Application No. PCT/AU2019/050092 having an international filing date of 8 Feb. 2019, which designated the United States, the contents of which are incorporated herein by reference in its entirety.

FIELD

This invention relates to electronic animal tag readers.

BACKGROUND

Electronic animal tags, such as RFID tags or devices, are used to identify farm animals. The electronic animal tags are physically attached to the animals and are read by a corresponding reader when they are in close enough proximity.

SUMMARY

According to a first example embodiment there is provided a reader for reading electronic animal tags, the reader comprising: a panel; two antennae disposed within the panel, wherein each antenna is associated with a respective race and configured to transmit and/or receive information to/from an electronic animal tag in that respective race; and an electromagnetic shield in or on the panel, the electromagnetic shield being configured to impede an antenna from transmitting and/or receiving information to/from an electronic animal tag not located in the respective race of that antenna.

According to a further embodiment there is provided a system for reading electronic animals tags comprising a plurality of readers, each reader located at or near a wall of a respective plurality of races, wherein each reader is at least partially shielded by an electromagnetic shield; each reader being longitudinally offset with respect to at least one other reader in the plurality of readers.

BRIEF DESCRIPTION OF THE DRAWINGS

The invention is described by way of example with reference to the drawings, which show some embodiments of the invention. However, these are provided for illustration only. The invention is not limited to the particular details of the drawings and the corresponding description.

DETAILED DESCRIPTION

Figure 1:
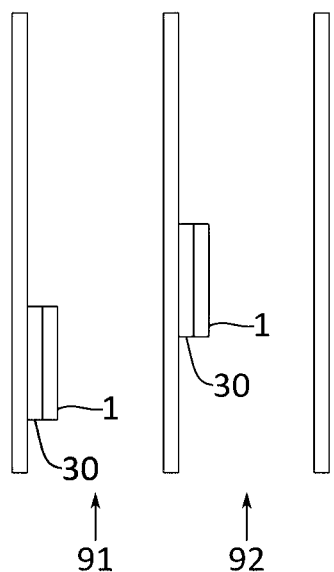
FIG. 1 is a diagram of a plurality of offset and partially shielded readers.

FIG. 1 depicts an embodiment of a system for reading electronic animal tags. A plurality of races 91, 92, chutes, or other avenues where animals may pass through is provided. The system comprises a plurality of readers 1, wherein each reader 1 is located at or near a wall of the plurality of races. Each reader 1 within the plurality of readers is at least partially shielded by an electromagnetic shield 30. Furthermore, each reader within the plurality of readers is longitudinally offset with respect to at least one other reader in the plurality of readers.

A group of animals are collected in a yard or pen, with each animal having an electronic animal tag typically affixed to the ear or ankle, or within its rumen. The electronic animal tag may be an RFID tag or RFID device. Each animal passes through one of the races in single file. As each animal approaches a reader positioned on one of the walls of the race it is traversing, the animal's electronic animal tag is interrogated and read by the reader via an electromagnetic field generated by the reader.

Readers can unintentionally read electronic animal tags from multiple animals at the same time, or from animals traversing a race not associated with that reader. This can create tag collisions or other errata as the group or animals are individually read. Each reader 1 is longitudinally offset relative to its neighbours. In this cause, longitudinally refers to the direction of movement of the animals through the races, chutes, or other avenues. This offsets the electromagnetic field generated and used by each reader to read electronic animal tags. This offset reduces the likelihood of a reader erroneously reading electronic animal tags in races other than the single intended race. Furthermore, the electromagnetic shield 30 provided with each reader impedes electromagnetic fields generated by readers from unintentionally encroaching into a neighbouring race.

In this case, impeding may mean preventing the reading entirely. That is, the field generated by a reader may be prevented from reading a tag in a neighbouring race. Additionally or alternatively, impeding may mean attenuating a signal. That is, the field generated by a reader may be attenuated such that, while it can read a tag in a neighbouring race, the signal strength is substantially lower than it would have been without the shield.

This may reduce the likelihood of a reader erroneously reading electronic animal tags located in multiple races. Additionally or alternatively, where a reader reads an animal tag in a neighbouring race, the signal is attenuated. This results in a lower received signal strength indicator (RSSI) which can be used to differentiate which reading should be preferred. The system may therefore provide more accurate results and higher throughput of electronic animal tag readings.

Figure 2:
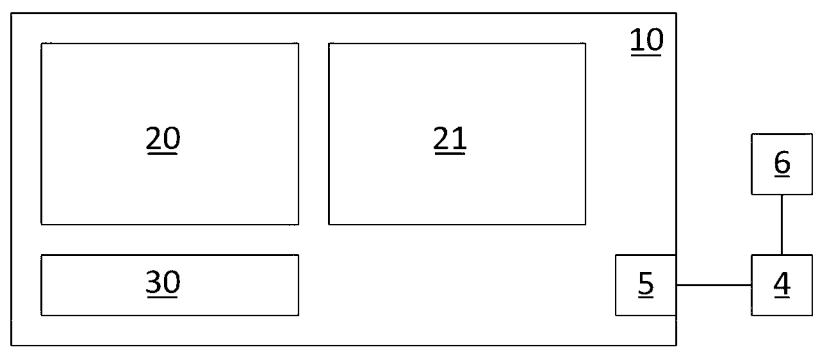
FIG. 2 is a box diagram of a reader.

FIG. 2 depicts a block diagram of an embodiment of a reader 1 which is configured to read electronic animal tags. The reader comprises a panel 10, inside of which are disposed antennae 20 and 21. The reader 1 also comprises an electromagnetic shield 30, which is either disposed within panel 10 or outside the panel 10. A controller 4 is communicatively coupled to the antennae 20, 21 through a reader interface 5. The controller may be communicatively coupled to further external devices through additional interfaces 6.

Figure 3:
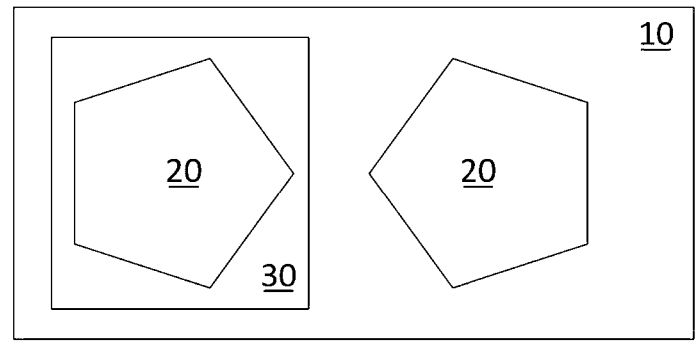
FIG. 3 is a diagram depicting a front view of a reader.
Figure 4:
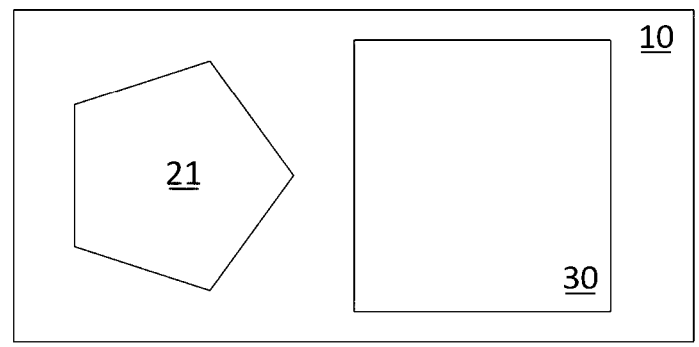
FIG. 4 is a diagram depicting a back view of a reader.
Figure 5:
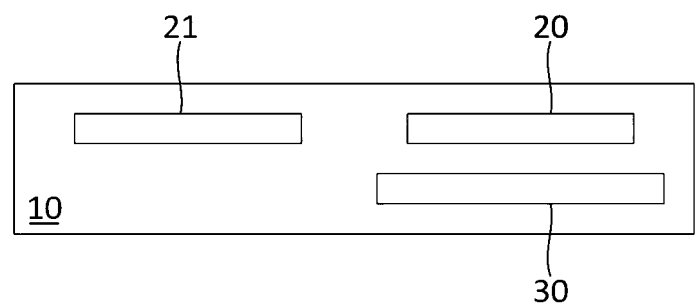
FIG. 5 is a diagram depicting a plan view of a reader.

FIGS. 3 to 5 illustrate a reader in front view, back view, and plan view respectively. A reader 1 comprises a panel 10, antennae 20 and 21 disposed within panel 10, and electromagnetic shield 30. In some embodiments, the electromagnetic shield 30 is disposed within the panel 10. Alternatively, the shield 30 can be affixed to or positioned near the exterior of the panel 10. Each antenna 20 and 21 within the panel 10 is energized by a controller (not shown) with an electric current to generate an electromagnetic field. In some embodiments, each antenna 20 and 21 comprises a coil. In some embodiments, these coils may be substantially circular or pentagonal in shape.

The shape of the coil may be configured to charge tags irrespective of their orientation. For example, the coil may be shaped to generate a substantially uniform field across the race such that the field should charge a tag at any orientation.

The direction of the magnetic field produced by each antenna during operation can be determined by the controller. For example, in the case that each antenna 20 or 21 comprises a coil, the direction of the magnetic field can be determined by the direction of current flow as provided by a power source via the controller. In this way, the magnetic field produced by antennae 20 and 21 can be configured to span a chosen race, thereby associating each antenna with a particular race.

There is no restriction on the direction of the magnetic field produced by each antenna 20 and 21. Each antenna may produce complementary fields in separate directions, and therefore be associated with separate races. Alternatively, both antennae may produce magnetic fields in the same direction, and therefore be associated with the same race.

Figure 6:
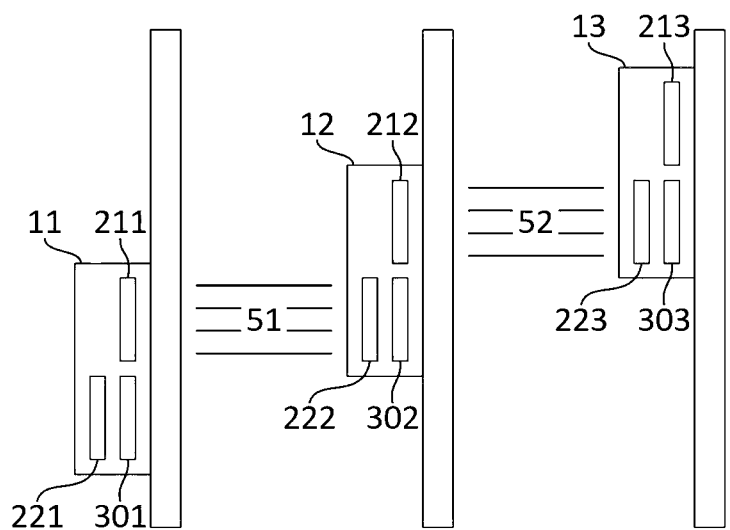
FIG. 6 is a diagram showing multiple readers.

A plurality of readers 1 are configured to be used in a stockyard or location with a plurality of races, chutes, or other avenues where animals may pass through, preferably in single file. An example embodiment of a system comprising multiple readers is shown in FIG. 6. Readers 11, 12, 13 are located at or near respective walls of two separate races 91, 92, which may only represent a subset of the plurality of races. Each reader is longitudinally offset with respect to at least one other reader in the plurality of readers.

Each antenna of each reader is associated with a race to produce an electromagnetic field spanning that race. For every antenna associated with a particular race, there may be a second antenna associated with that same race disposed within a separate reader. Furthermore, at least one antenna associated with each race is impeded from transmitting or receiving information to or from an animal tag not located in that respective race by an electromagnetic shield. This impeding may prevent the reading, or may substantially attenuate the signal.

In one embodiment, the longitudinal offset of the plurality of readers in the system is configured so that two antennae associated with the same race lie in parallel planes, and may be configured to face one another. This allows for pairs of antennae associated with the same race to be utilized in a Helmholtz configuration, which may produce a stable and uniform electromagnetic field.

In the above embodiment, antennae 211 and 222 belonging to readers 11 and 12 respectively are both associated with race 91, and are both aligned along their lateral axes. They are utilized in a Helmholtz configuration to produce electromagnetic field 51 spanning race 91. Electromagnetic shield 302 disposed within reader 12 impedes antenna 222 from transmitting or receiving information to or from an animal tag not located in race 91. However, any transmission or reception to or from an electronic animal tag located in race 91 is not impeded by electromagnetic shield 302. Likewise, antennae 212 and 223 belonging to readers 12 and 13 respectively are utilized in a Helmholtz configuration to produce electromagnetic field 52 spanning race 92. Electromagnetic shield 303 impedes antenna 223 from transmitting or receiving information to or from an animal tag not located in race 92.

As each animal traverses through race 91 or 92, the animal passes at least one antenna associated with that race, and therefore passes through the electromagnetic field spanning that race. The electronic animal tag associated with that animal is illuminated and energized by the electromagnetic field, and correspondingly conveys its identification signal to the antennae. For example, this conveyance can take the form of changing the electrical load of the tag as seen by the antenna, or reradiating at a different frequency or amplitude. Those skilled in the art will recognize the varied ways that an electronic animal tag can convey its identification information.

The identification signal is detected by the least one antenna associated with the race and is passed to a controller controlling the antenna. The controller is configured to receive an identification signal from at least one animal electronic animal tag in a race based on an interaction with the electronic animal tag and the at least one antennae associated with that race. In some embodiments, the controller may interpret or decode the identification signal passed on to the controller from the at least one antennae.

Figure 7:
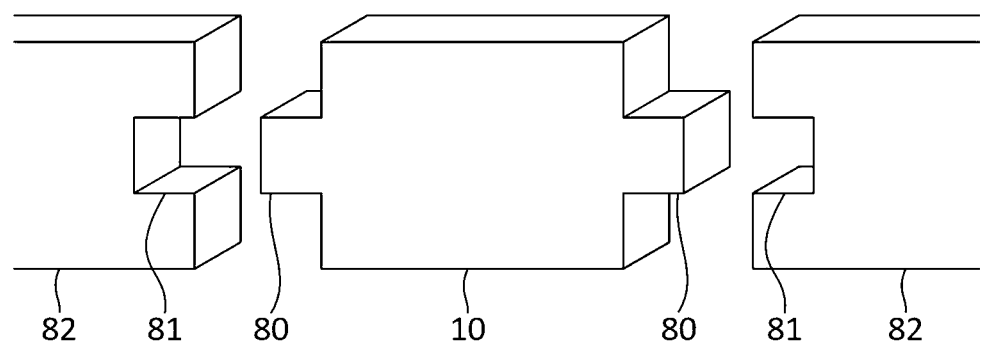
FIG. 7 depicts the connecting members of a reader.

In some embodiments, the panel 10 forming part of the reader 1 may be formed at least in part of fiberglass or plastic. In some embodiments, the panel 10 may be formed at least in part by two flat structures which have been laminated. In some embodiments, the panel 10 may be configured to form at least part of, and/or couple to, the wall of a race. One such embodiment is depicted in FIG. 7. In this embodiment, connecting members 80 on the distal ends of panel 10 connect with correspondingly-sized receptacles 81 belonging to existing structure 82 to form one contiguous whole. Alternatively or additionally, the front or back face of the panel 10 could, for example, comprise a hook or other connecting member 83 used to mount or couple the panel onto an existing structure.

The electromagnetic shield 30 associated with reader 1 is configured to impede at least one of antennae 20 and 21 from transmitting and/or receiving information to or from an animal tag located in a race not associated with that antenna. In some embodiments, this is achieved by suitably configuring the shape and/or geometry of the electromagnetic shield, and/or by suitably positioning the electromagnetic shield relative to the respective antenna. The electromagnetic shield 30 may be disposed within the panel 10 of the reader 1. In some embodiments, the electromagnetic shield 30 is adjacent to at least one of the antennae disposed within the panel 10. In alternative embodiments, the electromagnetic shield 30 may be disposed outside the panel 10.

Figure 8:
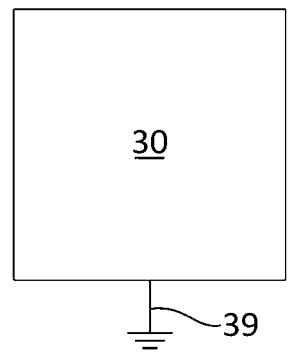
FIG. 8 is a diagram of a first embodiment of an electromagnetic shield.
Figure 9:
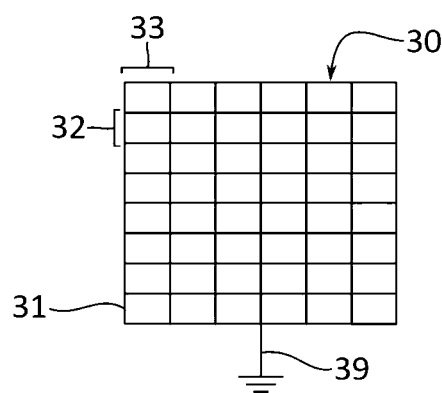
FIG. 9 is a diagram of a second embodiment of an electromagnetic shield.
Figure 10:
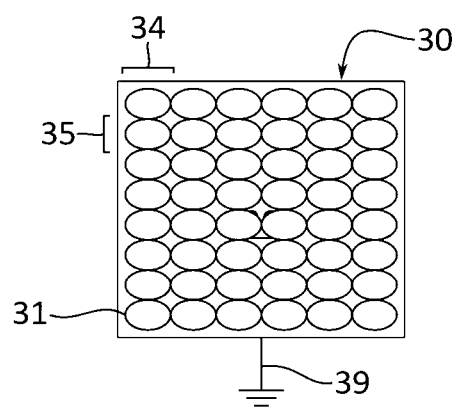
FIG. 10 is a diagram of a third embodiment of an electromagnetic shield.

FIGS. 8 to 10 show example embodiments of the electromagnetic shield 30. The electromagnetic shield 30 may be formed at least in part of a conducting material capable of absorbing electromagnetic radiation, and may be formed at least in part of copper, nickel, and/or aluminium. That is, in some cases a ferrous material may be used to attenuate the field generally, or a non-ferrous material may be used to attenuate only a radio frequency component of the field, and not attenuate a magnetic component of the field.

In some embodiments, the electromagnetic shield 30 is electrically grounded. This may be achieved by establishing an electrical connection to ground 39. Alternatively, the electromagnetic shield 30 may be electrically floating.

In one embodiment, the electromagnetic shield 30 comprises a solid or hollow conducting sheet or object. In another embodiment, the electromagnetic shield comprises a conducting mesh or screen, and has associated apertures 31. For example, these apertures 31 may be rectangular or elliptical depending on how the electromagnetic shield 30 is constructed. In the case of rectangular apertures, the shape of apertures 31 is defined by the length of the sides 32 and 33 of each aperture. These sides may be equal in length, resulting in square apertures, or unequal in length, resulting in non-square rectangular apertures. In the case of circular apertures, the shape of the aperture is defined by the major axis 34 and minor axis 35. These axes may be equal in length, resulting in circular apertures, or unequal in length, resulting in non-circular elliptical apertures.

Those skilled in the art will recognize that a range of uniform or non-uniform geometrical shapes could be used to define the apertures of a conducting mesh or screen, and at a variety of angular orientations with respect to one another. These could include triangles, diamonds, and hexagons, amongst others. These could vary in their shape, their size, and/or their skew throughout the conducting mesh or screen.

In some embodiments, the electromagnetic shield 30 is configured to impede electromagnetic radiation of frequencies falling within 918-926 MHz, 13.553-13.567 MHZ, 6.765-6.769 MHz, and/or 125-148.6 kHz. These embodiments of the electromagnetic shield 30 are useful when the electronic animal tags to be read comprise RFID tags or devices, as these frequency ranges represent the regulatory operating bandwidths of low-frequency to ultra-high-frequency RFID technologies. In embodiments where the electromagnetic shield comprises a conducting mesh or screen, impediment of these frequency ranges by the electromagnetic shield 30 can be achieved, for example, by configuring the dimensions of the apertures 31 comprising the conducting mesh or screen. These apertures 31 partially determine which frequencies of electromagnetic radiation are impeded by the shield, and to what extent they are impeded.

Alternatively or additionally, in embodiments where the electromagnetic shield 30 comprises a solid or hollow conducting sheet or object, impediment of the above frequency ranges by the electromagnetic shield 30 could be achieved by adjusting the thickness, geometric shape, or composition of the electromagnetic shield, all of which partially determine which frequencies of electromagnetic radiation are impeded by the shield, and to what extent they are impeded.

Those skilled in the art will recognize that the exact operating frequency ranges may vary from country to country depending on each country's respective laws and regulations, and that these laws and regulations may change over the course of time. Similarly, new RFID systems utilizing frequency ranges which differ from the above may emerge as research and development in RFID technologies progresses with time. The electromagnetic shield 30 need not be homogeneous throughout its entirety. In some embodiments, portions of the electromagnetic shield 30 may comprise a solid conducting sheet, while other portions may comprise a conducting mesh or screen. Furthermore, in embodiments of the electromagnetic shield 30 which comprise a conducting mesh or screen, the apertures 31 need not be uniform. The geometric shape of each aperture may vary throughout the conducting mesh or screen. Additionally or alternatively, the dimensions and/or skew of the apertures 31 may vary throughout the conducting mesh or screen.

Selectively impeding at least one of the antennae 20 or 21 from transmitting and/or receiving information to or from a tag not located in a race associated with that at least one antenna can be achieved, by example, by configuring the position or geometric shape of the electromagnetic shield 30 relative to the associated at least one antenna, by configuring the dimensions, shapes, and positions of apertures 31 in the case that the electromagnetic shield comprises a conducting mesh or screen, or a combination of the two.

As an example, an electromagnetic shield consisting of a solid or hollow conducting sheet or object could be disposed adjacent to a first antenna disposed within the panel of the reader, substantially impinging on its produced electromagnetic field, while not impinging on the electromagnetic field of the other antenna by virtue of the separation between them. As a further non-limiting example, an electromagnetic shield comprising a conducting mesh or screen could cover the entire front or back surface of the panel 10 of the reader 1. The dimensions of the apertures 31 defined by the portion of the conducting mesh overlapping a first antenna could be configured to impede electromagnetic radiation of a particular frequency range used in electronic animal tag reading, while the dimensions of the apertures defined by the portion of the conducting mesh overlapping a second antenna could be configured to allow electromagnetic radiation of the same frequency range to pass through substantially unimpeded.

Those skilled in the art will recognize that there are several different ways that the electromagnetic shield 30 may be configured to selectively impede at least one antenna from transmitting or receiving electromagnetic radiation of a particular frequency from races not associated with that at least one antenna.

Figure 11:
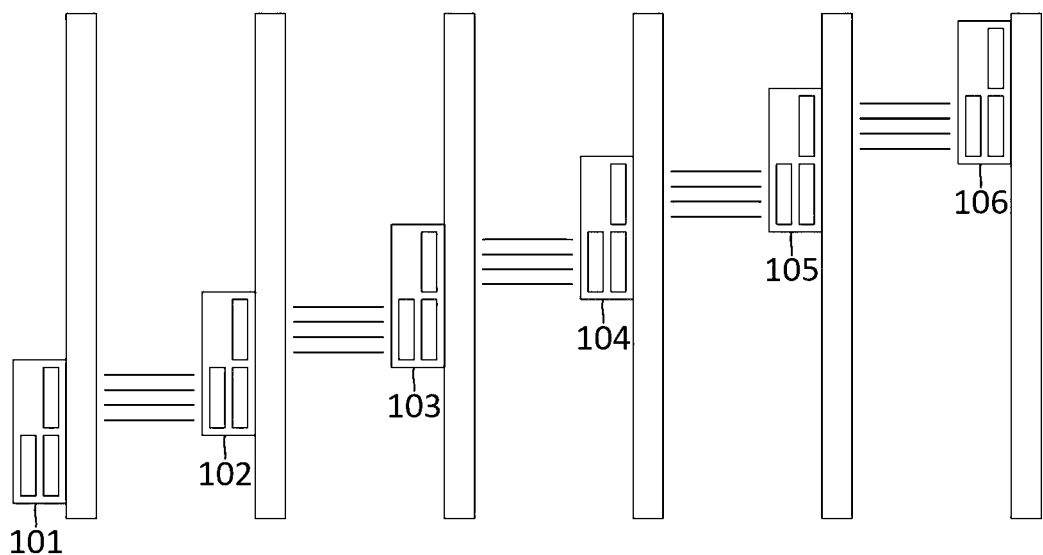
FIG. 11 is a diagram showing an embodiment of offset readers.

In addition to the electromagnetic shields present in each reader, systems comprising multiple readers and multiple races may use a range of different longitudinal offsets between readers to impede the reader from reading electronic animal tags from unintended races. FIG. 11 depicts an embodiment where a plurality of readers 101-106 are placed at or near the walls of a plurality of races 900. Each reader in the plurality of readers is longitudinally offset relative to every other reader in the plurality, with no two readers in the plurality substantially aligned along their lateral axis. That is, as an animal passes through, the animal will tend to pass one reader at a time. Despite the longitudinal offset, each reader at least partially overlaps with at least one other reader along their lateral axes. Arranging the readers such that no two readers in the plurality of readers 100 substantially align along their lateral axes reduces the possibility of a given reader unintentionally reading an animal tag not located in the race associated with that reader.

Figure 12:
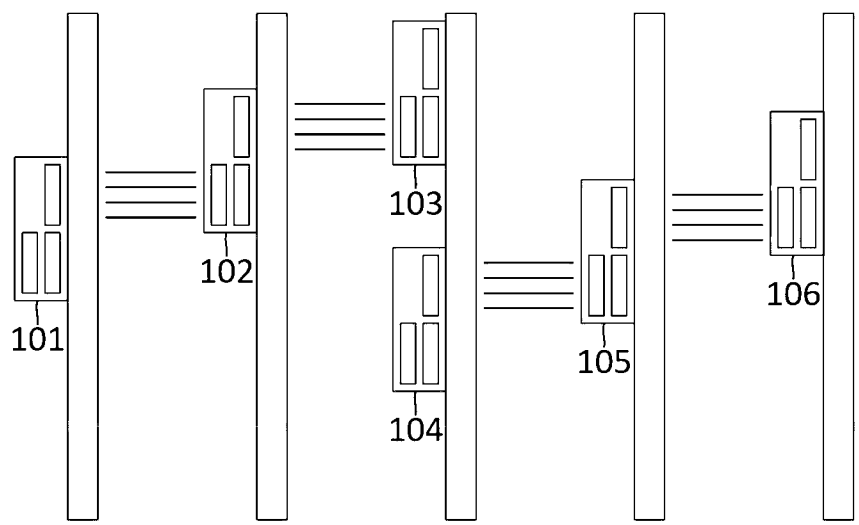
FIG. 12 is a diagram showing a further embodiment of offset readers.

In alternative embodiments, the plurality of readers may be offset such that each reader in the plurality is longitudinally offset with respect to at least one other reader in the plurality. Such embodiments of the system allow for some readers in the plurality to laterally align with other readers in the plurality. FIG. 12 depicts an embodiment where a plurality of readers 101-106 are placed at or near the walls of a plurality of races 900. Each reader in the plurality of readers is longitudinally offset with respect to at least one other reader in the plurality and may be offset relative to its neighbours, e.g. reader 102 is longitudinally offset from readers 101 and 103. However, reader 102 is not longitudinally offset from reader 105. Furthermore, each reader at least partially overlaps with at least one other reader along their lateral axes. These embodiments of the system are useful for situations where the length of each race in the plurality of races 900 restricts the total number of races that can be used when each reader in the plurality of readers is offset from every other reader. In practice, the readers which do align in these embodiments are spaced sufficiently far apart so that the chance of a reader reading an animal tag in the race associated with a laterally-aligned reader is low.

Embodiments of the reader 1 described above need not be restricted to use with a plurality of races. In one embodiment, two readers are located at or near the walls or boundaries of a race or other avenue which animals will traverse. This race. chute, or other avenue could comprise a single race in a stockyard, a loading ramp for loading or unloading animals to or from a vehicle, or the entry to a corral, amongst other examples.

The readers may be substantially aligned along their lateral axis so that the antennae within one reader are substantially aligned with the antennae within the other reader. Alternatively, the readers may be longitudinally offset such that only one antenna of the first reader and one antenna of the second reader are substantially aligned. The aligned antennas are energized by a controller such that their generated electromagnetic fields span the race or avenue which animals will traverse. The aligned antennas may be used in a Helmholtz configuration to increase the homogeneity of the electromagnetic field spanning the race, chute, or avenue.

As animals pass through the race or avenue, they necessarily pass through the electromagnetic field spanning the race or avenue, which illuminates and energises their electronic animal tags. In this way, the readers can effectively be used in systems which do not comprise a plurality of races.

Figure 13:
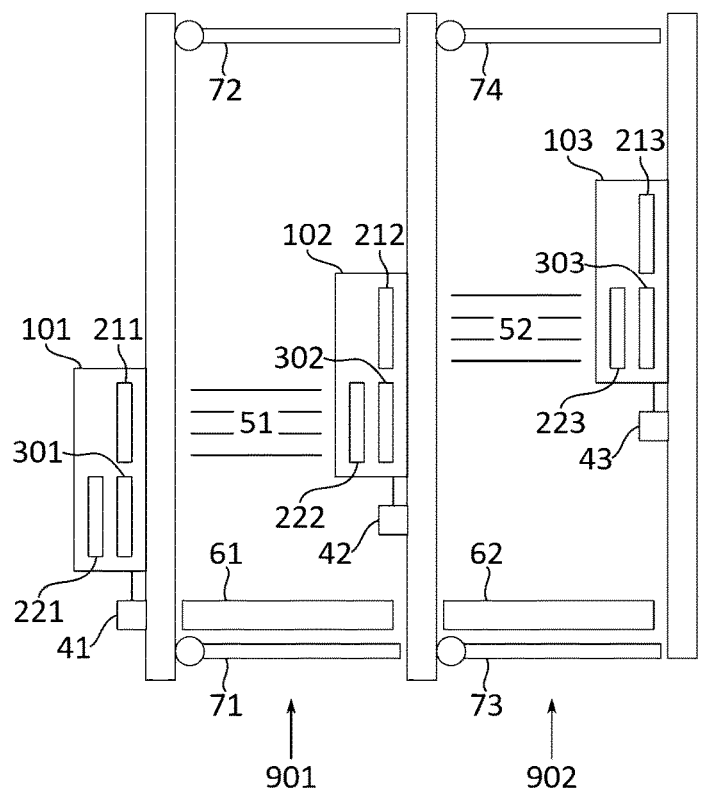
FIG. 13 is a diagram showing a plurality of readers in a plurality of races.

An example system comprising a plurality of readers 101-103 in a plurality of races 901, 902 is shown in FIG. 13. A plurality of readers 101-103 and associated controllers 41-43 are located at or near the walls of a plurality of races 901, 902. Each controller 41-43 within the plurality of controllers is configured to receive an identification signal from an identification signal from an electronic animal tag in at least one race. Each controller 41-43 comprises storage media configured to record identification signals from electronic animal tags and any information associated therewith, and a transmitter configured to transmit any information received by the controller and/or stored in the associated storage media of the controller.

Each race within the plurality of races further comprises a walk-over weighing system 61, 62 communicatively coupled to a controller, a gate or other structure 71, 73 communicatively coupled to a controller configured to automatically control the ingress of animals to that respective race, and a gate or other structure 72, 74 communicatively coupled to a controller configured to automatically control the egress of animals from that respective race.

In one embodiment, each reader in the plurality of readers 101-103 is longitudinally offset from every other reader in the plurality. Each antenna 211, 221, 212, 222, 213, 223 within each reader is energized by its associated controller 41, 42, 43, thereby generating an electromagnetic field across a race and associating that antenna with that race.

The antennae within the plurality of readers are energized in such a way that for each antenna associated with a race belonging to a particular reader in the plurality, there is a corresponding antenna also associated with that race belonging to a distinct reader in the plurality. For example, antenna 211 belonging to reader 101 is associated with race 901. Likewise, antenna 222 belonging to reader 102 is associated with race 901. Furthermore, the plurality of readers is longitudinally offset in such a way that each pair of antennae associated with a particular race are substantially aligned along their lateral axes, thereby aligning their magnetic fields. For example, antennae 211 and 222 are aligned along their lateral axes due to the longitudinal offset between readers 101 and 102. Each pair of antennae associated with a race is then utilized in a Helmholtz configuration, and each race in the plurality of races is spanned by an electromagnetic field generated by a Helmholtz pair of antennae. For example, race 901 is spanned by electromagnetic field 51 generated by antennae 211 and 222 utilised in a Helmholtz configuration. Likewise, race 902 is spanned by electromagnetic field 52 generated by antennae 212 and 223 utilised in a Helmholtz configuration.

A group of animals are collected in a yard or pen, with each animal having an electronic animal tag typically affixed to the ear or ankle, or within its rumen. The introduction of the animals to the plurality of races 901, 902 is automatically controlled by a controller via gates or other structures 71 and 73. In one embodiment, each controller automatically controls the ingress of animals into its respective race, e.g. controller 41 or 42 automatically controls the ingress of animals into race 901 through gate 71. In an alternative embodiment, a single controller automatically controls the ingress of animals into every race by controlling all ingress gates. Those skilled in the art will recognize that a variety of controller and control delegation systems could be used to automatically control the ingress of animals into the plurality of races. The automatic control of animal ingress into the plurality of races may ensure that the animals traverse through each respective race in single file, or may reduce the likelihood of bottlenecks forming in the plurality of races.

After the animals have been admitted into the plurality of races by the controller or controllers, they progress through the plurality of races. Each animal passes over the walk-over weighing system associated with the race through which the animal walks, which detects the animal's weight. This information is passed to the controller, which stores the detected weight in its storage media. For example, an animal enters race 901 through gate 71, controlled by controller 41. As it progresses down race 901, it walks over the walk-over weighing system 61, which measures the animal's weight. This measured weight is passed to controller 41 which stores the measured weight in its storage media.

As the animals continue to progress through the plurality of races, each animal passes through an electromagnetic field generated by a Helmholtz pair of antennae associated with the race which the animal is walking down. The electronic animal tag associated with each animal is energized by the electromagnetic field spanning the race said animal is passing through, and correspondingly conveys its identification signal to the Helmholtz pair of antennae. This conveyance can take the form of changing the electrical load of the tag as seen by the antenna, reradiating at a different frequency or amplitude, or other possibilities. Those skilled in the art will recognize the varied ways that an electronic animal tag can convey its identification information.

The identification signal conveyed by each animal tag is detected by the pair of antennae associated with that animal's race, which then passes the detected signal to a controller associated with that race. The controller stores this information in its storage media, and may associate each received identification signal with the weight of each animal as measured by the walk-over weighing system. Furthermore, the controller may associate each identification signal it receives with the race from which that identification signal originated, and also store this association in its storage media.

To continue the previous example, the animal walking through race 901 passes through electromagnetic field 51 generated by the pair of antennae 211 and 222 associated with race 901. The electronic animal tag associated with the animal is illuminated by the electromagnetic field 51 generated by pair 211, 222, and its identification signal is conveyed to the pair 211, 222 which then pass the identification signal to controller 41. Controller 41 stores this identification signal in its storage media, and may associate the received identification signal with the weight of the animal as previously weighed by walk-over weighing system 61. Additionally, the controller may associate either or both of the identification signal and/or the animal's weight with race 901, which is the race wherefrom the identification signal originated.

It is possible for a reader to unintentionally read electronic animal tags located in multiple or unintended races, which can cause tag collisions or erroneous readings. The longitudinal offset between readers 101, 102, 103 helps to reduce the likelihood that these unintentional readings will occur. As each reader is longitudinally offset from at least one other reader in the plurality, the electromagnetic fields 51 and 52 spanning the races 901 and 902 are similarly offset. Ensuring that the electromagnetic fields spanning neighbouring races are not aligned reduces the likelihood of a reader unintentionally reading an electronic animal tag located in an unintentional race.

Furthermore, each reader 101, 102, 103 is at least partially shielded by an associated electromagnetic shield 301 302 303. These further reduce the likelihood of tag misreading. The electromagnetic shields 301, 302, 303 are configured to impede an antenna belonging to respective readers 101, 102, 103 from transmitting and/or receiving information to/from an electronic animal tag not located in the respective race of that antenna, or at least to attenuate the signal between the readers. For example, antenna 222 is impeded from reading electronic animal tags in race 902 by electromagnetic shield 302.

Once an animal's weight has been measured via a walk-over weighing system 61 and its electronic animal tag has been read by one or more readers, the animal is allowed to egress through the gate or other structure 72 or 74 automatically controlled by an associated controller. If the associated controller has not received an identification signal from the animal's electronic animal tag, or the walk-over weighing system has not successfully measured the animal's weight, the controller may not allow the animal to egress through the gate or structure. Furthermore, the associated controller may not allow any further animals to ingress via the gate or other structure 71, 73 until the animal currently in the race has egressed. The automatic control of animal ingress and egress may make the identification of malfunctioning animal tags easier, or may simplify identifying when a tag is being misread or not read at all.

The plurality of identification signals received from the plurality of electronic animal tags which are stored in the storage media of controllers 41-43, along with their corresponding associations with the plurality of walk-over weighing systems and plurality of races, can be transmitted by said controllers. These transmissions can occur frequently, with, for example, each identification signal and its corresponding associations being transmitted by each controller as the electronic animal tag corresponding to that identification signal is read. Alternatively, the controllers may transmit the entire record of identification signals and associations once the entire group or herd of animals has been read. Those skilled in the art will recognize the various schedules that the controllers could implement to transmit information.

The possible device or devices used to receive transmissions from the controller 41-43 are extensive. These may include smartphones or other mobile or handheld devices configured to receive transmissions from the controller. Alternatively or additionally, these may include non-portable devices such as personal computers or repeater stations configured to receive transmissions from the controller. The transmissions could utilize Bluetooth, Zigbee, cellular signals, or other transmission techniques or protocols. Those skilled in the art will recognize the wide variety of devices which could be used to receive transmissions from the controllers, and the wide variety of transmission techniques or protocols that the controllers and receiving devices could use.

Method of Manufacturing

Figure 14:
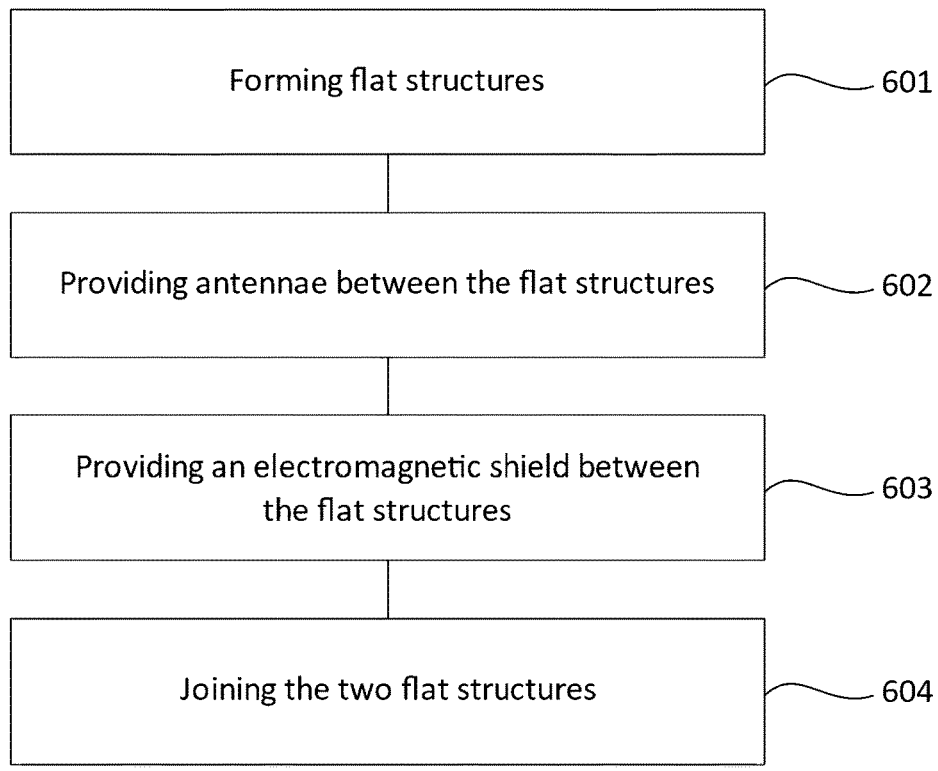
FIG. 14 is a method of constructing a reader.

A reader used in the above system may be manufactured through a method 600 shown in FIG. 14.

At step 601, two flat structures are formed. This may comprise routing a plastic panel to a predetermined configuration, shape, or profile in order to create a flat structure to form part of a panel. Alternatively, other manufacturing techniques such as moulding, 3D printing, or fabrication may be used according to the requirements of the application.

The flat structures may be formed at least in part by several materials, including plastic or fiberglass. These may include thermoset polymers including epoxy, polyester resin, or a thermoplastic. Particularly in embodiments where the flat structures are formed at least in part of fiberglass, the flat structures may be formed at least in part of chop strand mat and resin, and formed using a mould and hand lay-up technique. The flat structures may comprise members to engage or couple to antennae or an electromagnetic shield.

At step 602, one or more antennae are provided between the flat structures. This may comprise winding an electrical conductor onto at least one of the flat structures via one or more of the engagement or coupling members which form at least part of at least one of the flat structures. This may involve winding a left electrical conductor onto a left member, and/or winding a right electrical conductor onto a right member. These wound electrical conductors and may comprise coils. In particular, the electrical conductors may be wound in a circular/oval or pentagonal shape. However, those skilled in the art will recognize the wide variety of possible shapes that could be achieved by winding.

The antenna may be located within a groove of a respective flat structure. This allows the flat structure to maintain its profile after the antenna is installed.

In other embodiments, providing antennae between the flat structures may comprise affixing antennae to at least one of the flat structures. This could be achieved by securing pre-formed antennae or pre-wound coils to engagement or coupling members which form at least part of the flat structures. These could be affixed through a variety of means such as epoxy or adhesives, or through mechanical means such as rivets or screws and plates.

At step 603, an electromagnetic shield is provided between the flat structures. This may comprise affixing an electromagnetic shield to one of the flat structures. In some embodiments, this may comprise affixing an electromagnetic shield within a groove in the flat structure, to allow the flat structure to maintain its profile after the electromagnetic shield is installed. This could be achieved by using epoxy or other adhesives, or through mechanical means.

In some cases, the shield may be a mesh or the like, which is adhered to the flat surface using a glue or other adhesive. The glue can penetrate and fuse through the mesh. This avoids creating a weak spot which may otherwise be created when using a mesh.

In other embodiments, affixing an electromagnetic shield to one of the flat structures may comprise affixing the entire electromagnetic shield flush with the inside face of one of the flat structures. This could be achieved through adhesive or mechanical means, and may prove especially useful in embodiments of readers comprising an electromagnetic shield comprising a conducting mesh or screen. At step 604, the two flat structures are joined together.

Prior to joining the two flat structures together, a cover may be bonded over the antennae. The antennae or wound electrical conductors may be terminated in an electrical circuit or electrical conductor, which may comprise cabling and a plug.

Interfaces between the reader and the controller or other external devices may also be electrically connected to the antennae.

Joining the two flat structures together may comprise laminating the two flat structures together. This may comprise applying heat to each flat structure while sandwiching the two together. Additional bonding or sealing agents may be employed, such as silicone, to ensure that the structures are properly joined into a single structure, and to ensure that the produced structure is watertight. Alternatively, the joining of the two flat structures may comprise joining through adhesive means, such as epoxy, or joining through mechanical means, such as rivets, screws, and nuts. Additionally these methods may comprise the further use of bonding or sealing agents to prevent ingress of water into the reader.

Interpretation

The term "comprises" and other grammatical forms is intended to have an inclusive meaning unless otherwise noted. That is, they should be taken to mean an inclusion of the listed components, and possibly of other non-specified components or elements.

The present invention has been illustrated by the description of some embodiments. While these embodiments have been described in detail, this should not be taken to restrict or limit the scope of the claims to those details. Additional advantages and modifications will readily appear to those skilled in the art. Therefore, the invention in its broader aspects is not limited to the specific details of the illustrative examples shown and described. Accordingly, modifications may be made to the details without departing from the spirit or scope of the general inventive concept.

The invention claimed is:

1. A system for reading electronic animal tags comprising:
a plurality of two or more readers, each reader located at or near a wall of a respective plurality of races;
wherein each reader has at least one antenna;
wherein the antenna in a reader is associated with a single race to produce an electromagnetic field spanning that race;
each reader is impeded from transmitting or receiving information to or from an animal tag not located in that respective race by at least one electromagnetic shield;
each reader being longitudinally offset with respect to at least one other reader in the plurality of readers.

2. The system of claim 1, wherein for every race in the plurality of races, there are two readers with antenna associated with that race.

3. The system of claim 1, wherein the two readers associated with a specific race are longitudinally offset from one another.

4. The system of claim 1, wherein each reader is impeded by at least two magnetics shields.

5. A system according to claim 1, wherein each reader constitutes a part of a panel, and wherein the respective panels of the two or more readers are identical to one another.

6. The system of claim 5, wherein the panel is formed at least in part of plastic or fiberglass.

7. The system of claim 1, wherein each antenna comprises a coil, wherein each coil is substantially circular or pentagonal in shape, and wherein each coil is configured to be used in a Helmholtz configuration.

8. The system of claim 1, wherein the electromagnetic shield comprises a conducting mesh, wherein the conducting mesh is electrically grounded or electrically floating, and wherein the apertures of the conducting mesh are elliptical or rectangular.

9. The system of claim 8, wherein the conducting mesh is configured to impede electromagnetic radiation of frequencies falling within a range of at least one of:
918-926 MHz;
13.553-13.567 MHz;
6.765-6.769 MHz; and
125-148.5 KHz.

10. A method of constructing a reader according to claim 1, comprising:
providing two flat structures;
providing at least one antenna in or on one of the flat structures;
providing an electromagnetic shield in or on one of the flat structures; and
joining the two flat structures together.

11. The method of claim 10, where providing at least one antenna comprises winding an electrical conductor onto at least one of the flat structures.

12. The method of claim 10, wherein providing an electromagnetic shield comprises affixing an electromagnetic shield to at least one of the flat structures.

13. The method in claim 10, wherein the joining comprises laminating the two flat structures together.

* * * * *